United States Patent Office 3,543,305
Patented Nov. 24, 1970

3,543,305
COMBATING UNDESIRED PLANT GROWTH WITH PHENOXYALKANOYLAMIDOOXYAL-KANOIC COMPOUNDS
Ralph P. Neighbors, Olathe, Kans., assignor to Gulf Research & Development Company, Pittsburgh, Pa., a corporation of Delaware
No Drawing. Continuation-in-part of application Ser. No. 668,180, Sept. 15, 1967. This application Sept. 13, 1968, Ser. No. 759,761
Int. Cl. A01n 9/20, 9/24
U.S. Cl. 71—108
11 Claims

ABSTRACT OF THE DISCLOSURE

Both broadleaf weeds and common noxious grasses such as yellow and green foxtail are combated in fields of small grains such as wheat, barley and oats by use of phenoxyalkanoylaminoöxyalkanoic acids and derivatives thereof, for example, 2-phenoxypropanoylaminoöxy acetic acid, formulated either as free acid or salts.

DESCRIPTION OF INVENTION

This application is a continuation-in-part of U.S. Ser. No. 668,180, filed Sept. 15, 1967, in which phenoxy-acetamidoöxyacetate esters are disclosed and claimed as novel herbicides.

The chlorophenoxyacetic acid type of herbicides is well known. These compounds are easily formulated and have proved to be effective in combating broadleaf weeds in grain crops but are generally deficient with respect to activity against the common noxious grasses. When used in sufficient quantities to be effective against the grasses, they severely injure or kill grain crops. I have now discovered a new class of herbicidal compounds derived from the phenoxyacetic acids which are easily formulated as amine salts or lower alkyl esters, are highly active and at the same time are able to control both broadleaf weeds and some of the more common noxious grasses in small grains. Briefly, my method of combating undesired plant growth comprises applying to the locus of the plant a herbicidally effective quantity of a phenoxyalkanoylamino-öxyalkanoic compound represented by the structural formula

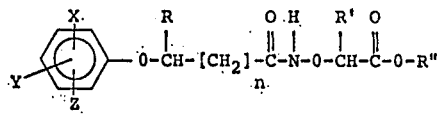

in which X and Y are selected from hydrogen, methyl and chloro substituents, Z is selected from hydrogen and chloro substituents, R, R' and R" are selected from hydrogen and lower alkyl substituents and $n$ may vary from 0 to 2.

SYNTHESIS OF HERBICIDAL COMPOUNDS

Both the free acids and lower alkyl esters are conveniently made by reacting a haloalkanoic acid or ester with a phenoxyalkanohydroxamic acid. Preparation of a hydroxamic acid, as well as both acid and ester herbicides are illustrated by the following specific procedures:

(A) Preparation of 2-(4'-chloro-2'-methylphenoxy)-acetohydroxamic acid

Into a 3-liter, 3-necked round-bottomed flask was placed 49.0 g. (0.7 mole) of hydroxylamine hydrochloride, 1500 ml. of toluene and 74.2 g. (0.7 mole) of sodium carbonate. The contents were stirred and the flask was cooled in an ice bath to 10° C. To the flask there was then added dropwise, with stirring, 105 ml. of water during a period of 30 minutes, maintaining the temperature below 10° C. There was then added dropwise, with stirring, 153.0 g. (0.7 mole) of 4-chloro-2-methylphenoxyacetyl chloride in 400 ml. of toluene during a period of about 30 minutes. The ice bath was then removed and stirring was continued for an hour. A warm water bath (45° C.) was then put under the flask and stirring was continued for an hour and 45 minutes. The crystalline product was recovered by filtration, was washed on the filter with water, then with hexane, was dried and recrystallized from a mixture of ethyl acetate and hexane. Weight after recrystallization and drying was 128.8 g., M.P. 128–9° C.

Calc'd for $C_9H_{10}ClNO_3$ (percent): C, 50.13; H, 4.67; Cl, 16.44; N, 6.48. Found (percent): C, 49.71; H, 4.79, Cl, 16.65; N, 6.81.

(B) Preparation of ethyl 2,4-dichlorophenoxyacetamido-öxyacetate

A solution of ethyl bromoacetate (8.35 g., 0.05 mole) in ethanole (50 ml.) was added to a solution of 2-(2',4'-dichlorophenoxy)acetohydroxamic acid (11.8 g., 0.05 mole) in 0.5 N sodium hydroxide (100 ml., 0.05 mole). The mixture was stirred, heated and refluxed for 4 hours. After cooling to 25° C., water (400 ml.) was added to precipitate the crude product which was removed by filtration and dried. Recrystallization from a mixture of benzene and hexane gave 7.0 g. (43.4%) of product, M.P. 85–87° C.

Calc'd for $C_{12}H_{13}Cl_2NO_5$ (percent): C, 44.74; H, 4.06; N, 4.35. Found (percent): C, 44.31; H, 4.04; N, 4.25.

(C) Preparation of 2,4-dichlorophenoxyacetamido-öxyacetic acid

A solution of bromoacetic acid (13.9 g., 0.1 mole) in ice water (50 ml.) was neutralized with 10% sodium hydroxide (phenophthalein indicator). This neutralized solution was added to a solution of 2-(2',4'-dichlorophenoxy)acetohydroxamic acid (23.6 g., 0.1 mole) in 0.5 N sodium hydroxide (200 ml., 0.1 mole). The mixture was stirred, heated, and refluxed 4 hours, then cooled to 15° C. and acidified with dilute hydrochloric acid. The crude product was removed by filtration, washed with water, and dried. Recrystallization from a mixture of ethyl acetate and hexane gave 16.7 g. (56.8%; M.P. 168–70° C.) of product.

Calc'd for $C_{10}H_9Cl_2NO_5$ (percent): C, 40.84; H, 3.08; N, 4.76. Found (percent): C, 40.40; H, 3.15; N, 4.40.

The compounds listed below were prepared according to the general procedure exemplified above.

| Substituents in generic structural formula | | | | | | | Empirical formula | M.P., °C. |
|---|---|---|---|---|---|---|---|---|
| X | Y | Z | $n$ | R | R' | R'' | | |
| 4-Cl | 2-CH$_3$ | H | 0 | H | H | H | C$_{11}$H$_{12}$ClNO$_5$ | 148–154 |
| 3-CH$_3$ | 3-CH$_3$ | H | 0 | H | H | H | C$_{12}$H$_{15}$NO$_5$ | 163–165 |
| 2-Cl | 4-Cl | H | 2 | H | H | H | C$_{12}$H$_{13}$Cl$_2$NO$_5$ | 103–105 |
| H | H | H | 0 | CH$_3$ | H | H | C$_{11}$H$_{13}$NO$_5$ | 113–114 |
| 2-Cl | 4-Cl | 5-Cl | 0 | H | H | H | C$_{10}$H$_8$Cl$_3$NO$_5$ | 162–163 |
| 3-Cl | 4-Cl | H | 0 | H | CH$_3$ | H | C$_{11}$H$_{11}$Cl$_2$NO$_5$ | 141–145 |
| 3Cl | 4-Cl | H | 0 | H | H | H | C$_{10}$H$_9$Cl$_2$NO$_5$ | 173–176 |
| 2-Cl | 4-Cl | 5-Cl | 2 | H | H | H | C$_{12}$H$_{12}$Cl$_3$NO$_5$ | 124–122 |
| 2-Cl | 4-Cl | H | 0 | H | CH$_3$ | H | C$_{11}$H$_{11}$Cl$_2$NO$_5$ | 141–140 |
| 2-Cl | 4-Cl | H | 0 | H | H | H | C$_{12}$H$_{13}$Cl$_2$NO$_5$ | 168–170 |
| 2-Cl | 4-Cl | H | 0 | H | H | C$_2$H$_5$ | C$_{12}$H$_{13}$Cl$_2$NO$_5$ | 85–79 |
| H | H | H | 0 | H | H | C$_2$H$_5$ | C$_{12}$H$_{15}$NO$_5$ | 77–75 |
| 4-Cl | 2-CH$_3$ | H | 0 | H | H | C$_2$H$_5$ | C$_{13}$H$_{16}$ClNO$_5$ | 53–52 |
| 2-Cl | 4-Cl | 5-Cl | 0 | H | H | C$_2$H$_5$ | C$_{12}$H$_{12}$Cl$_3$NO$_5$ | 80–89 |
| 2-Cl | 4-Cl | 5-Cl | 2 | H | H | C$_2$H$_5$ | C$_{14}$H$_{16}$Cl$_3$NO$_5$ | 87–80 |

COMBATING UNDESIRED PLANT GROWTH

So as to have a valid basis for comparison of results, all of the weed control tests discussed below were made on plants of approximately the same age (about two to three weeks) were similarly formulated in water as a diluent, with the aid of suitable emulsifiers and dispersing agents and were sprayed at a spray volume of about 40 gallons per acre.

2,4-dichlorophenoxyacetic acid was applied post-emergently at a rate of 0.75 lb. per acre. Complete control was obtained on the following weeds: wild buckwheat, lambsquarters, corn cockle, pigweed, wild mustard and morning glory. There was no injury to wheat, barley or oats. There was no injury to yellow foxtail and only moderate injury to green foxtail. Injury to these weeds, however, was more than compensated by control of competing species, so that the overall result was a complete lack of control of these two species. When the application rate was reduced to 0.5 lb. per acre there was only moderate injury to corn cockle and complete lack of control of three species.

2-methyl-4-chlorophenoxyacetic acid was applied post-emergently at a rate of 0.75 lb. per acre. Complete control was obtained on the following weeds: Wild buckwheat, lambsquarters, corn cockle, pigweed, wild mustard, and morning glory. There was slight injury to green foxtail which was only temporary and no injury to yellow foxtail. There was no injury to wheat, barley or oats. When the application rate was reduced to 0.5 lb. per acre there was only moderate injury to corn cockle with resulting failure to control three species.

The novel herbicides of this invention are all of higher molecular weight than the phenoxyacetic acid herbicides, so that on a molar basis, one pound per acre application rate of one of the new compounds is roughly comparable to the application of one of the phenoxyacetic acids at 0.75 lb. per acre. There is substantial variation both in molecular weight and herbicidal activity of the new compounds, with resulting variation in optimum application rates. The optimum rate under specific climatic conditions is readily determined by empirical methods with which those skilled in the art are familiar. Use of the new herbicides in the method of this invention is illustrated in the following specific examples.

Example 1.—2,4 - dichlorophenoxyacetamidoöxyacetic acid was applied post emergently to seven species of weseds, barley and oats at the rate of 2 lbs. per acre. Injury to barley and oats was slight and only temporary. Complete control was obtained on the following weeds: wild mustard, wild buckwheat, lambsquarters, yellow foxtail, green foxtail and morning glory. About 75 percent control was obtained on corn cockle. Upon pre-emergent application at a rate of 10 lb. per acre, complete control of crabgrass was obtained with the herbicide, along with several broadleaf species.

Example 2.—4-(2',4'-dichlorophenoxy) butyrylaminoöxyacetic acid was applied pre-emergently at 10 lb. per acre, giving complete control of crabgrass with only slight, temporary injury to oats. Post-emergent application at 2 lb. per acre gave complete control of the following weeds: rape, flax, green foxtail, giant foxtail, pigweed, wild buckwheat, lambsquarters, morning glory and mustard. About 50 to 75 percent control was obtained on corn cockle and yellow foxtail. Injury to barley, oats and wheat was only slight.

Example 3.—2 - methyl-4-chlorophenoxyacetamidoöxyacetic acid was applied post-emergently at 2 lb. per acre. Complete control was obtained on the following weeds: mustard, wild buckwheat, lampsquarters, corn cockle, green foxtail, morning glory, pigweed, flax and rape. Approximately 75 percent control was obtained on yellow foxtail and giant foxtail. Injury to barley and oats was temporary and only slight. At an application rate of 10 lb. per acre, there was obtained complete pre-emergent control of crabgrass and millet, as well as a number of broadleaf species.

Example 4.—The ethyl ester of 2,4-dichlorophenoxyacetamidoöxyacetic acid was applied post-emergently at the rate of 2 lb. per acre. Complete control was obtained on the following weeds: green foxtail, pigweed, wild buckwheat, lambsquarters and morning glory. Approximately 75 percent control was obtained on corn cockle. Injury to wheat and barley was slight, and only temporary.

When the same herbicide was mixed into soil at the rate of 10 lb. per acre, pre-emergent control was obtained on the following weeds: crabgrass, coxcomb, brome grass, millet and flax. There was significant injury to germinating corn but results indicated that by reduction of application rate, pre-emergent control of a substantial number of weeds may be obtained with tolerable injury to corn.

This herbicide is particularly suitable for control of weeds, both pre- and post-emergently, in standing grain crops.

Example 5.—The ethyl ester of 2-methyl-4-chlorophenoxyacetamidoöxyacetic acid was applied post-emergently in aqueous dispersion at 2 lb. per acre giving complete control of the following weeds: rape, flax, green foxtail, pigweed, wild buckwheat, lambsquarters and mustard. Approximately 75 percent control was obtained on corn cockle. There was no significant injury to oats or wheat.

When the same herbicide was incorporated in soil at the rate of 10 lb. per acre, complete pre-emergent control was obtained on crabgrass, coxcomb, millet and flax.

This herbicide is particularly suited to use in standing grain crops to control weeds, both pre- and post-emergently.

Example 6.—2 - phenoxypropionamidoöxyacetic acid was applied post-emergently in aqueous dispersion at 2 lb. per acre, giving complete control of rape, flax, green foxtail, corn cockle, giant foxtail, pigweed, wild buckwheat, lambsquarters and mustard. There was no significant injury to oats and wheat.

When incorporated in soil at the rate of 10 lb. per acre, complete control was obtained on crabgrass, coxcomb and flax.

This herbicide is particularly useful for controlling weeds in standing crops of grains.

Example 7.—At post-emergent application rates of both 1 and 2 lb. per acre, 2-(3',4'-dichlorophenoxyacetamido- öxy)propionic acid gave complete control of mustard, wild buckwheat, lambsquarters, yellow foxtail, green foxtail and morning glory, with only slight injury to barley, oats and wheat.

This herbicide is particularly useful in combating green and yellow foxtail, as well as broadleaf weeds in standing crops of small grains.

Example 8.—At post-emergent application rates of both 1 lb. and 2 lb. per acre, the ethyl ester of 2,4,5-trichlorophenoxyacetamidoöxyacetic acid gave complete control of mustard, wild buckwheat, lambsquarters, green foxtail and morning glory with no more than slight injury to barley, oats and wheat.

This herbicide is useful in combating weeds in wheat, particularly in areas where green foxtail presents a serious weed-control problem.

Example 9.—At a post-emergent application rate of 2 lb. per acre, 3,4-dichlorophenoxyacetamidoöxyacetic acid gave complete control of mustard, wild buckwheat, lambsquarters, green foxtail and morning glory. There was no injury to oats or wheat and only slight injury to barley.

This herbicide is highly selective and may be used at application rates as high as 5 or 6 lb. per acre, if desired, to combat thick infestations of weeds in oats and wheat.

Example 10.—At a post-emergent application rate of 2 lb. per acre, 2,4,5-trichlorophenoxyacetamidoöxyacetic acid gave complete control of mustard, wild buckwheat, lambsquarters, green foxtail and morning glory, with only slight injury to oats. Approximately 75 percent control was obtained on corn cockle and yellow foxtail. At an application rate as low as ½ lb. per acre, complete control of wild buckwheat, lambsquarters, green foxtail and morning glory was obtained, with no injury to barley, oats and wheat.

This herbicide is particularly useful in areas in which green foxtail is a problem in small grains.

I claim:

1. The method of combating undesired plant growth which comprises applying to the locus of the plant a herbicidally effective quantity of a phenoxyalkanoylaminoöxyalkanoic compound represented by the structural formula

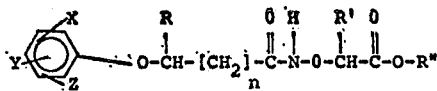

in which X and Y are selected from hydrogen, methyl and chloro substituents, Z is selected from hydrogen and chloro substituents, R, R' and R'' are selected from hydrogen and lower alkyl substituents and $n$ may vary from 0 to 2.

2. The method of combating undesired plant growth which comprises applying to the locus of the plant a herbicidally effective quantity of a compound represented by the structural formula

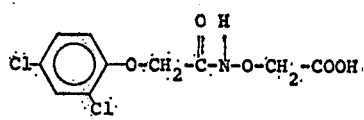

3. The method of combating undesired plant growth which comprises applying to the locus of the plant a herbicidally effective quantity of a compound represented by the structural formula

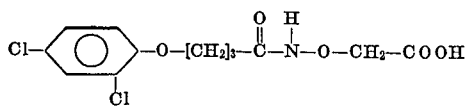

4. The method of combating undesired plant growth which comprises applying to the locus of the plant a herbicidally effective quantity of a compound represented by the structural formula

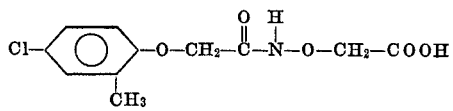

5. The method of combating undesired plant growth which comprises applying to the locus of the plant a herbicidally effective quantity of a compound represented by the structural formula

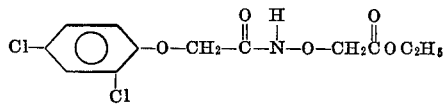

6. The method of combating undesired plant growth which comprises applying to the locus of the plant a herbicidally effective quantity of a compound represented by the structural formula

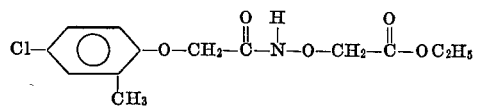

7. The method of combating undesired plant growth which comprises applying to the locus of the plant a herbicidally effective quantity of a compound represented by the structural formula

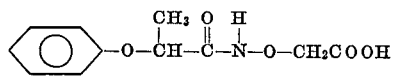

8. The method of combating undesired plant growth which comprises applying to the locus of the plant a herbicidally effective quantity of a compound represented by the structural formula

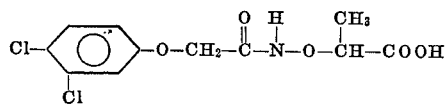

9. The method of combating undesired plant growth which comprises applying to the locus of the plant a herbicidally effective quantity of a compound represented by the structural formula

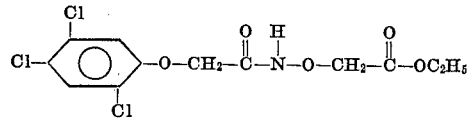

10. The method of combating undesired plant growth which comprises applying to the locus of the plant a herbicidally effective quantity of a compound represented by the structural formula

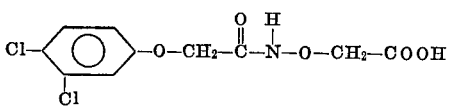

11. The method of combating undesired plant growth which comprises applying to the locus of the plant a herbicidally effective quantity of a compound represented by the structural formula

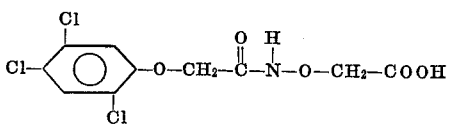

(References on following page)

References Cited

UNITED STATES PATENTS

| | | | |
|---|---|---|---|
| 2,577,969 | 12/1951 | Jones | 71—109 |
| 2,622,975 | 12/1952 | Zimmerman et al. | 71—118 |
| 2,636,816 | 4/1953 | Stewart | 71—118 |
| 3,162,525 | 12/1964 | Leasure | 71—113 |
| 3,236,871 | 2/1966 | Hinman | 71—118 |
| 3,282,987 | 11/1966 | Ellis | 260—471 |
| 3,306,726 | 2/1967 | Berliner et al. | 71—118 |
| 3,371,106 | 2/1968 | Berliner et al. | 71—118 |

LEWIS GOTTS, Primary Examiner

G. HOLLRAH, Assistant Examiner

U.S. Cl. X.R.

11—111, 116; 260—453, 500.5

PO-1050
(5/69)

UNITED STATES PATENT OFFICE
CERTIFICATE OF CORRECTION

Patent No. 3,543,305   Dated November 24, 1970

Inventor(s) Ralph P. Neighbors

It is certified that error appears in the above-identified patent and that said Letters Patent are hereby corrected as shown below:

In the table at the top of column 3, in the column listed under "X", line 7, "3Cl" should read --3-Cl.

In the column listed under "Empirical formula", line 15, should read --$C_{14}H_{16}Cl_3NO_5$. In the column listed under "M.P.,°C.", should read as follows:

148-150
    163-164
    103-105
    113-115
    162-164
    141-143
    173-175
    124-126
    141-142
    168-170
     85-70
     77-79
     53-55
     80-82
     87-89

Column 3, line 62, the word should read --weeds.

SIGNED AND
SEALED
MAR 16 1971

(SEAL)
Attest:

Edward M. Fletcher, Jr.
Attesting Officer

WILLIAM E. SCHUYLER, JR.
Commissioner of Patents